Oct. 1, 1929.                F. M. BRITTNACHER                1,729,703
                                  OIL GAUGE
                           Filed March 27, 1928          2 Sheets-Sheet 1

Frank M. Brittnacher, Inventor

Witnesses
By Irving L. McCathran
Attorney

Oct. 1, 1929.  F. M. BRITTNACHER  1,729,703
OIL GAUGE
Filed March 27, 1928   2 Sheets-Sheet 2
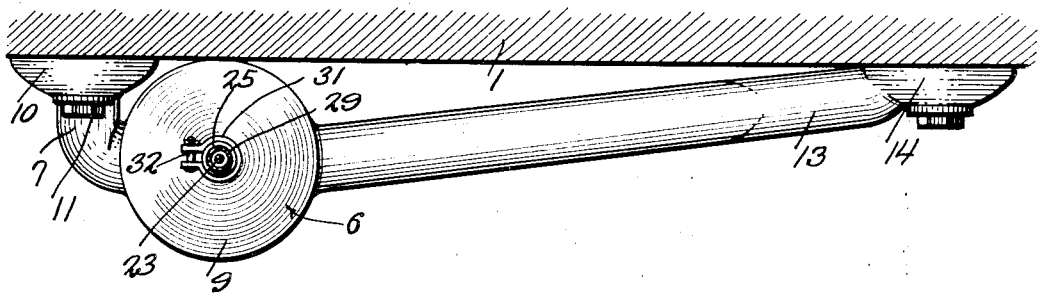
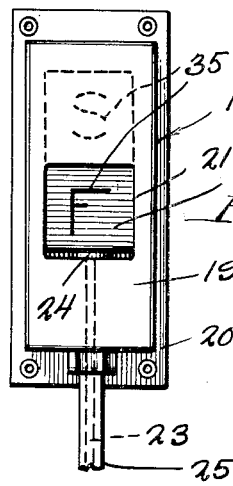 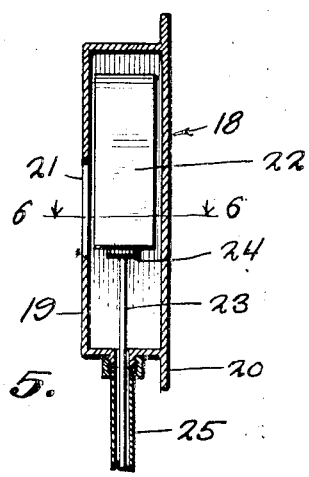
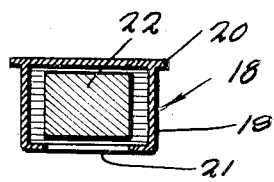 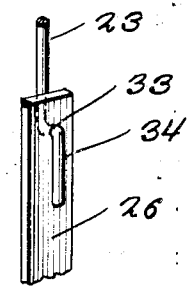
Frank M. Brittnacher, Inventor Patented Oct. 1, 1929

1,729,703

UNITED STATES PATENT OFFICE

FRANK M. BRITTNACHER, OF APPLETON, WISCONSIN

OIL GAUGE

Application filed March 27, 1928. Serial No. 265,053.

This invention relates to oil gauges for internal combustion engines and has as one of its objects to provide a gauge which may be readily attached to an engine not already equipped with such a gauge, as for example the engine of the "Model A" Ford automobile, the invention, in this respect, contemplating a gauge which may be readily installed upon the engine casing in lieu of the overflow or return pipe by which the oil is conducted from the valve chamber to the oil pan and which attachment will embody a gauge adapted to be mounted upon the dash or instrument board of the automobile to indicate to the driver, at all times, the sufficiency of the oil supply as well as the efficiency of the oil pumping apparatus of the engine, thus avoiding damage to the engine which would result if the oil supply became substantially exhausted or if the oil distributing mechanism failed to properly function.

Another object of the invention is to so construct the gauge attachment, embodying the invention, that no alteration in the construction of the engine itself will be necessitated by the installation of the attachment, the attachment being so constructed that it may be readily and quickly installed immediately upon removal of the said overflow pipe, thereby obviating any necessity for altering the construction of the engine casing or any of the parts associated therewith.

Another object of the invention is to provide an indicating means of the class described extremely simple in construction and adapted to be readily mounted or installed upon internal combustion engines of the ordinary types and embodying an indicating unit which may be conveniently arranged upon the instrument board or dashboard of the automobile so as to be in full view of the driver.

While the accompanying drawing and the description which is to follow, constitute a disclosure of the preferred embodiment of the invention, it will be understood that various changes may be made within the scope of what is claimed.

In the accompanying drawing:

Figure 3 is a top plan view of the structure shown in Figure 2;

Figure 4 is a view in elevation of the indicator of the gauge;

Figure 5 is a vertical sectional view through the indicator;

Figure 6 is a horizontal sectional view taken substantially on the line 6—6 of Figure 5 looking in the direction indicated by the arrows;

Figure 7 is a fragmentary perspective view illustrating a portion of the stem of the float of the gauge and the manner in which connection is established between the same and the indicator of the gauge.

Figure 1:
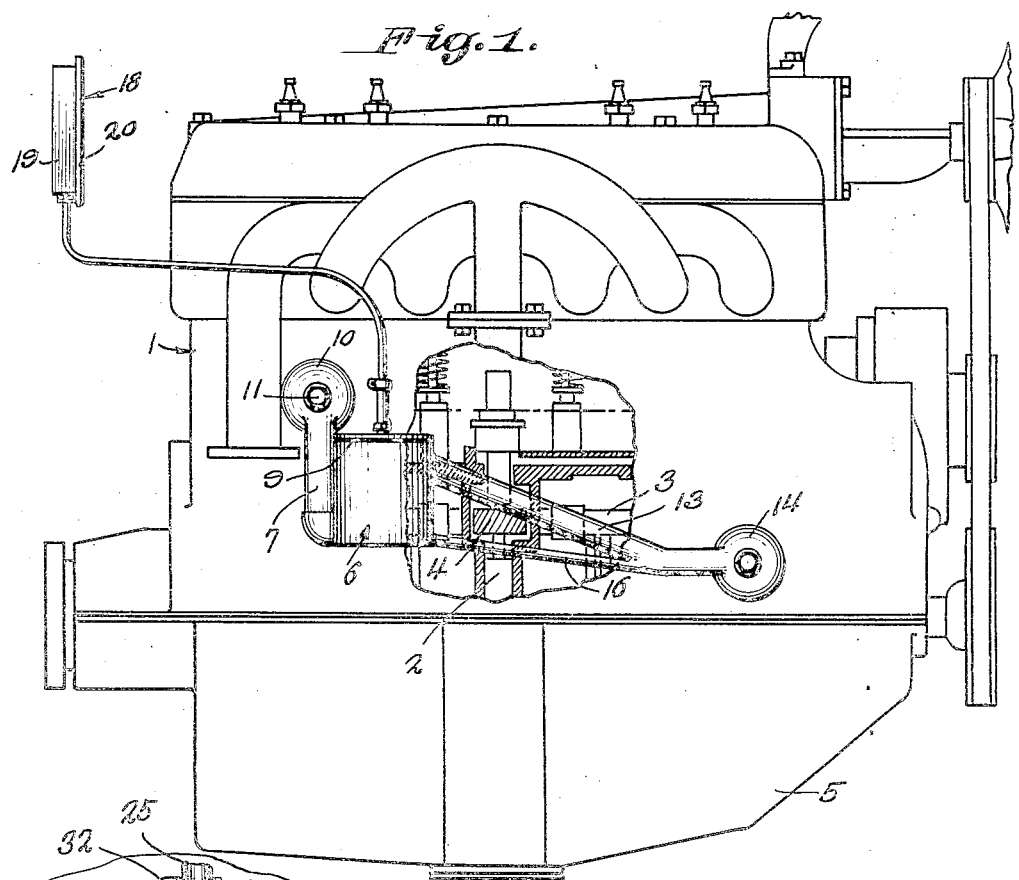
Figure 1 is a view in side elevation of the oil gauge embodying the invention installed upon an engine of the said Ford type, a portion of the engine casing being broken away.
Figure 2:
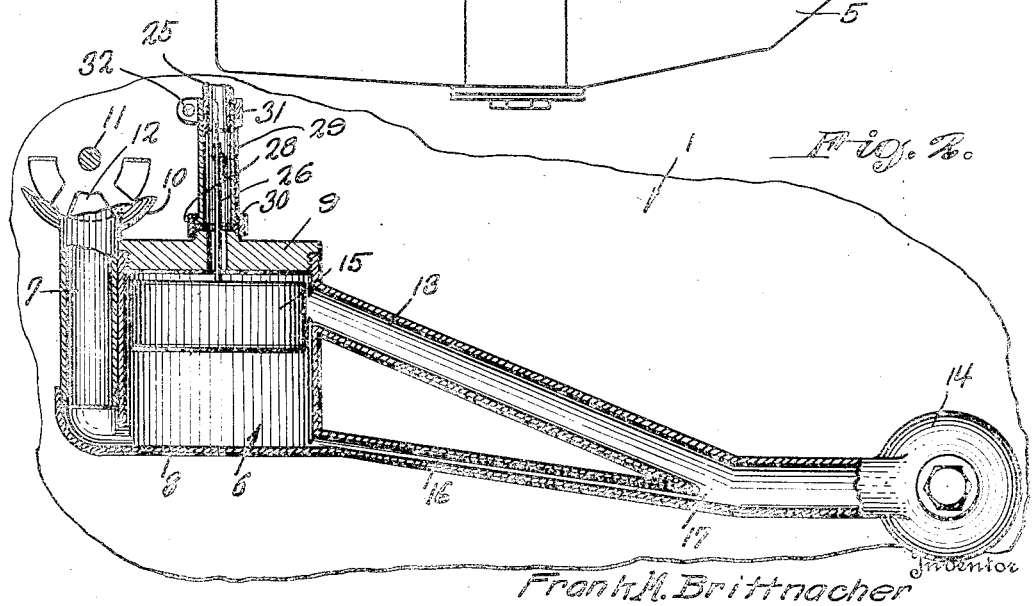
Figure 2 is a vertical longitudinal sectional view through that portion of the gauge embodying the invention which is installed in lieu of the overflow or return pipe.

In the drawing the gauge embodying the invention is illustrated as installed upon the internal combustion engine of a Model A Ford automobile, which engine is indicated in general by the numeral 1 and embodying the usual oil pump 2 driven from the cam shaft 3 by the worm gearing 4, the oil pan being indicated by the numeral 5, and, as is usual, in engines of this type, when there is a sufficient supply of oil and the oil pumping mechanism is operating with the desired efficiency, the oil level in the valve chamber of the engine will be maintained substantially constant as indicated by the broken line in Figure 1. A lowering of the oil level indicates either a lowering of the supply to the danger point or a failure of the circulating mechanism to properly function and the present invention therefore contemplates the provision of a gauge which will indicate these conditions and which is constructed and arranged as will now be described.

The gauge apparatus embodying the invention is intended to be installed in place of the usual overflow pipe or return pipe by which the oil is conducted from the valve chambers to the oil pan in the circulation of the oil while the engine is in operation, and the improved apparatus includes a float chamber which is indicated by the numeral 6 and which is preferably of the cylindrical form shown in the drawings. A pipe 7 is securely connected at its lower end in an elbow extending laterally from the float chamber 6 substantially in a plane with the bottom 8 thereof and is led upwardly closely beside the chamber, and is preferably soldered thereto, the pipe leading to a point slightly above the horizontal plane occupied by the closed top 9 of the float chamber. The pipe 7 at its upper end is formed with a cup-shaped flange 10 which is secured by a bolt 11 to the side of the engine housing and placed in communication with the lubricant space of the valve chamber of the engine by way of the usual passages or ports 12. A pipe 13 leads at its upper end from the opposite side of the float chamber 6 and is inclined downwardly and laterally from the said chamber and provided at its lower end with a cup-shaped attaching flange 14 by which it is attached to the side of the engine casing and arranged to discharge into the oil pan 5. It will be observed by reference to Figure 1 that the upper end of the pipe 13 is connected with the valve chamber 6 near the upper end of said chamber and it will also be evident at this point that the pipe 13 constitutes an overflow for oil which is delivered to the chamber 6 after having overflowed from the valve chamber of the engine by way of the pipe 7. Therefore, in the operation of the engine, a constant level of oil will be maintained in the float chamber 6 and the float which is arranged therein and which is indicated by the numeral 15 will therefore be maintained, under proper running conditions, in an elevated position within the float chamber.

The numeral 16 indicates a drain pipe which is placed in communication at one end with the float chamber 6 at the bottom thereof and preferably at the side opposite the side at which the lower end of the pipe 7 is connected, the other end of the drain pipe 16 being merged as at 17 with the lower portion of the pipe 13 near the attaching flange 14. It will now be evident that, so long as there is an ample supply of lubricant in the system and so long as the distributing mechanism is functioning properly, there will be a level of lubricant in the float chamber 6 substantially at the top of said chamber and therefore the float 15 will occupy the elevated position shown in Figure 1 of the drawings. On the other hand, if the supply of lubricant is diminished to a considerable extent or the circulating mechanism ceases to function, the level of the oil in the float chamber will automatically lower and thus permit lowering of the float 15, and it will be evident at this point that after the level of the oil in the float chamber has passed below the upper end of the overflow pipe 13, oil may still flow from the said chamber, if the supply is further diminished, or if the distributing mechanism is not properly functioning, by way of the drain pipe 16 and therefore the float 15 may lower a greater or less distance depending upon the amount of reduction in volume of the oil and the effectiveness with which the oil is fed.

In order that the movement of the float 15 may be rendered clear to the driver of the automobile the engine of which is equipped with the gauge devices embodying the invention, indicator means is provided which will now be described. The indicator means is indicated in general by the numeral 18 and the same comprises a casing 19 which is of the oblong rectangular form shown in Figures 4, 5 and 6 of the drawings and which is provided at its back with an attaching flange or other means 20 whereby it may be secured upon the instrument board or dash of the automobile upon which the device of the invention is installed, the casing 19 being provided in its front with a sight opening which is indicated by the numeral 21 and which is preferably rectangular as shown in Figure 4. A display member 22 is vertically slidably mounted in the casing 19 and a flexible wire 23 is connected at one end as at 24 to the lower end of the member 22 and is led through a tubular guide 25, which is connected at its upper end to the lower end of the casing 19, to the float 15 to the upper end of which it is connected in a manner which will now be described. The float 15 is provided upon its upper side with a flat sided, centrally upstanding stem 26 and the closure 9 for the top of the float chamber 6 is formed upon its upper side with a short threaded nipple 27 to which is fitted a packing nut 28 which is flanged to engage the lower end of a tubular housing 29, a gasket 30 of copper being interposed between the lower end of the said housing and the upper end of the nipple 27 and the nut being tightened so as to provide a fluid tight joint at this point. The tubular guide 25 is fitted at its lower end in the upper end of the tubular housing 29, and a clamp 31 is applied about the upper end of the housing 29 and is tightened by a bolt 32 so as to secure the tubular guide 35 at its said lower end in the upper end of the housing 29. As illustrated in Figure 7 of the drawings, the lower end of the wire 23 is bent laterally at right angles and fitted through an opening 33 formed in the upper end of the stem 26 of the float 15, the terminal portion of the wire being bent at right angles to extend downwardly as at 34 beside said stem whereby to lock the lower end of the wire 33 to the upper end of the stem.

That face of the member 22 which is presented to the front 19 of the indicator casing 18, bears indicia 35 which may, for example, consist of the letters "S" and "F", the letter S for example, being located near the upper end of the member 22 and the letter F being located near the lower end of said member 22. By reference to the drawings it will now be evident that when the float 15 is in an elevated position, upward longitudinal thrust will be imposed upon the wire 23 maintaining the display member 22 of the indicator 18 in an elevated position within the casing and with that portion of its display face which bears the letter F, presented within the bounds of the sight opening 21 and, when the display member is in this position the driver of the automobile will know that there is a plentiful supply of lubricant and that the same is being properly fed to the bearings. In the event, however, that the supply of lubricant becomes depleted or the lubricant distributing mechanism fails to function, the oil level within the float chamber 6 will lower and, as a consequence, the float 15 will likewise lower thus exerting a pull upon the wire 23 and lowering the display member 22 to such position that the upper portion of its display face will be exposed to view through the sight opening 21 and therefore the letter S will be presented to the view of the driver of the automobile and this letter is intended to convey a warning to stop.

From the foregoing description of the invention it will be evident that there is provided an extremely simple construction and arrangement of parts, capable of ready installation upon the internal combustion engine of an automobile and upon the instrument board or dash thereof and which device will automatically indicate to the driver of the automobile the condition of the oil supply, as regards its volume, and the effectiveness with which the oil is being supplied to the bearings. It will likewise be evident that inasmuch as the inlet pipe 7 of the float chamber 6 is connected to the said chamber at one side thereof and at the bottom, and the overflow pipe 13 is connected to the opposite side of the chamber near the top thereof, there is an even circulation of lubricant through the float chamber which will not act to disturb the position of the float 15 so as to cause continual variations in the position of the display member 22 of the indicator, but the float will, on the other hand, be normally maintained in its elevated position and substantially stationary, so long as there is an ample supply of lubricant and the distributing mechanism is properly functioning. On the other hand it will be evident that the arrangement of the overflow pipe 13 and the drain pipe 16 constitutes a very efficient means whereby, in the falure of the lubricant supply, all surplus lubricant in the float chamber will be quickly drained therefrom so as to permit lowering of the float 15 and actuation of the signal display member 22 before any appreciable damage is caused.

Having thus described the invention, what I claim is:

1. As a new article of manufacture, an oil indicator attachment for internal combustion engines comprising an inclined oil conducting pipe having a cup at its lower end for connection with the crank case of the engine at one level, a float chamber connected at its upper end with the upper end of the pipe, a second pipe connected at its lower end with the lower end of the chamber and having a cup on its upper end communicating with the crank case above the first cup, a float in said chamber, and a sight gauge operatively connected to the float.

2. As a new article of manufacture, an oil indicator attachment for internal combustion engines comprising an inclined oil conducting pipe having a cup at its lower end for connection with the crank case of the engine at one level, a float chamber connected at its upper end with the upper end of the pipe, a second pipe connected at its lower end with the lower end of the chamber and having a cup on its upper end communicating with the crank case above the first cup, a float in said chamber, a sight gauge operatively connected to the float, and an inclined drain pipe communicating at its upper end with the lower end of the float chamber and with the inclined oil conducting pipe adjacent to the cup portion thereof.

In testimony whereof I affix my signature.

FRANK M. BRITTNACHER.